US010819658B2

(12) United States Patent
Fu

(10) Patent No.: US 10,819,658 B2
(45) Date of Patent: Oct. 27, 2020

(54) NETWORK MANAGEMENT WITH NETWORK VIRTUALIZATION BASED ON MODULAR QUALITY OF SERVICE CONTROL (MQC)

(71) Applicant: HEWLETT PACKARD ENTERPRISE DEVELOPMENT LP, Houston, TX (US)

(72) Inventor: Bin Fu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 1141 days.

(21) Appl. No.: 14/399,962

(22) PCT Filed: Jul. 22, 2013

(86) PCT No.: PCT/CN2013/079761
§ 371 (c)(1),
(2) Date: Nov. 10, 2014

(87) PCT Pub. No.: WO2014/026527
PCT Pub. Date: Feb. 20, 2014

(65) Prior Publication Data
US 2015/0113146 A1    Apr. 23, 2015

(30) Foreign Application Priority Data

Aug. 17, 2012  (CN) .......................... 2012 1 0293340

(51) Int. Cl.
*H04L 12/927*    (2013.01)
*H04L 12/24*    (2006.01)

(52) U.S. Cl.
CPC ........ *H04L 47/805* (2013.01); *H04L 41/0896* (2013.01)

(58) Field of Classification Search
CPC .......................... H04L 47/805; H04L 41/0896
(Continued)

(56) References Cited

U.S. PATENT DOCUMENTS 8,868,766 B1 * 10/2014 Theimer ............... G06F 9/5061
709/229
2009/0288084 A1 * 11/2009 Astete ................. G06F 9/45533
718/1
(Continued)

FOREIGN PATENT DOCUMENTS

CN        1744552      3/2006
CN      101499061      8/2009
(Continued)

OTHER PUBLICATIONS

International Search Report and Written Opinion dated Oct. 31, 2013 issued on PCT Patent Application No. PCT/CN2013/079761 dated Jul. 22, 2013, The State Intellectual Property Office, P.R. China.

*Primary Examiner* — Gil H. Lee

(57) ABSTRACT

The present disclosure describes implementation of network virtualization based on modular quality of service control (MQC) in a data center network. In one example, a command originating from a tenant of a VDC is received by a network management server, the command being associated with network resource processing based on MQC. Based on a network resource configuration for the VDC, the received command is processed on a network virtualization layer of the network management server such that only processing associated with the VDC of the tenant is performed.

19 Claims, 7 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 2010/0306776 | A1* | 12/2010 | Greene | G06Q 10/10 718/101 |
| 2011/0035494 | A1 | 2/2011 | Pandey et al. | |
| 2011/0153684 | A1* | 6/2011 | Yung | G06F 9/45533 707/805 |
| 2011/0296052 | A1* | 12/2011 | Guo | G06F 9/5077 709/240 |
| 2011/0296408 | A1 | 12/2011 | Lo et al. | |
| 2011/0318011 | A1* | 12/2011 | Brassil | H04J 14/02 398/82 |
| 2012/0036236 | A1* | 2/2012 | Richardson | H04L 12/66 709/220 |
| 2012/0054624 | A1* | 3/2012 | Owens, Jr. | G06F 9/5072 715/735 |
| 2012/0233668 | A1* | 9/2012 | Leafe | G06F 9/44526 726/4 |
| 2013/0014101 | A1* | 1/2013 | Ballani | H04L 67/101 718/1 |
| 2013/0019277 | A1* | 1/2013 | Chang | H04L 63/0218 726/1 |
| 2013/0238641 | A1* | 9/2013 | Mandelstein | G06F 17/303 707/756 |
| 2013/0268588 | A1* | 10/2013 | Chang | H04L 12/6418 709/204 |
| 2013/0290960 | A1* | 10/2013 | Astete | G06F 9/45533 718/1 |
| 2013/0297752 | A1* | 11/2013 | Bhanujan | H04L 41/0803 709/220 |
| 2014/0006580 | A1* | 1/2014 | Raghu | G06F 9/5072 709/223 |
| 2014/0032228 | A1* | 1/2014 | Johri | G06F 21/6227 705/1.1 |
| 2014/0115584 | A1* | 4/2014 | Mudigonda | H04L 67/1095 718/1 |
| 2014/0283010 | A1* | 9/2014 | Rutkowski | G06F 21/31 726/18 |
| 2014/0330936 | A1* | 11/2014 | Factor | H04L 63/0281 709/219 |

FOREIGN PATENT DOCUMENTS

| | | |
|---|---|---|
| CN | 102170457 | 8/2011 |
| CN | 102171998 | 8/2011 |
| CN | 102347979 | 2/2012 |
| CN | 102456028 | 5/2012 |
| WO | WO2012/055446 | 5/2012 |

* cited by examiner

NETWORK MANAGEMENT WITH NETWORK VIRTUALIZATION BASED ON MODULAR QUALITY OF SERVICE CONTROL (MQC)

CROSS-REFERENCE TO RELATED APPLICATION

The present application is a 371 application of International Application No. PCT/CN2013/079761 filed on Jul. 22, 2013 and entitled "Network Management with Network Virtualization based on Modular Quality of Service Control (MQC)," which claims benefit of Chinese Patent App. No. CN 201210293340.9 filed on Aug. 17, 2012.

BACKGROUND

As user demand continues to grow, network virtualization techniques may be used to provide an abstraction between physical network resources and their virtual representation. Network virtualization allows tenants in a data center network to share physical network resources that are logically separated into different virtual data centers (VDCs). From the point of view of tenants, they appear to have access to a full network which can be managed and deployed through network management. For example, the tenant may independently manage topology discovery and configuration management of its VDC.

BRIEF DESCRIPTION OF DRAWINGS

By way of non-limiting examples, the present disclosure will be described with reference to the following drawings, in which.

DETAILED DESCRIPTION

Although network resources are shared among tenants of different VDCs, the VDCs should be segregated from each other. For example, during network resource assignment, changes to one VDC should not affect another VDC. One way is to add a tenant's label to a message, such as using Virtual eXtensible Local Area Network (VXLAN) tags etc. A communications protocol called OpenFlow has also been developed.

The present disclosure describes implementation of network virtualization based on modular quality of service (QoS) control (MQC) in a data center network. In one example, a command originating from a tenant of a VDC is received by a network management server, the command being associated with network resource processing based on MQC. Based on a network resource configuration for the VDC, the received command is processed on a network virtualization layer of the network management server such that only processing associated with the VDC of the tenant is performed According to the present disclosure, the network management server implements a network virtualization layer to facilitate segregation among VDCs. Since a received command is processed based on the network resource configuration for the VDC, only processing associated with the VDC of the tenant is performed. As such, each VDC may be controlled and managed independently and the tenant of a particular VDC can only see and manage resources of that VDC without affecting or being affected by other VDCs.

Unlike VxLAN and Openflow, the example according to the present disclosure is implemented by the network management server and does not require significant modifications of existing network devices in the data center network. For example, compared to Openflow, the present disclosure is easier and less costly to implement because it does not require significant changes to network switches to allow separation of forwarding plane and control plane and addition of a FlowVisor that sits logically between the forwarding and control paths on network switches.

Examples will be described with reference to accompanying drawings.

Figure 1:
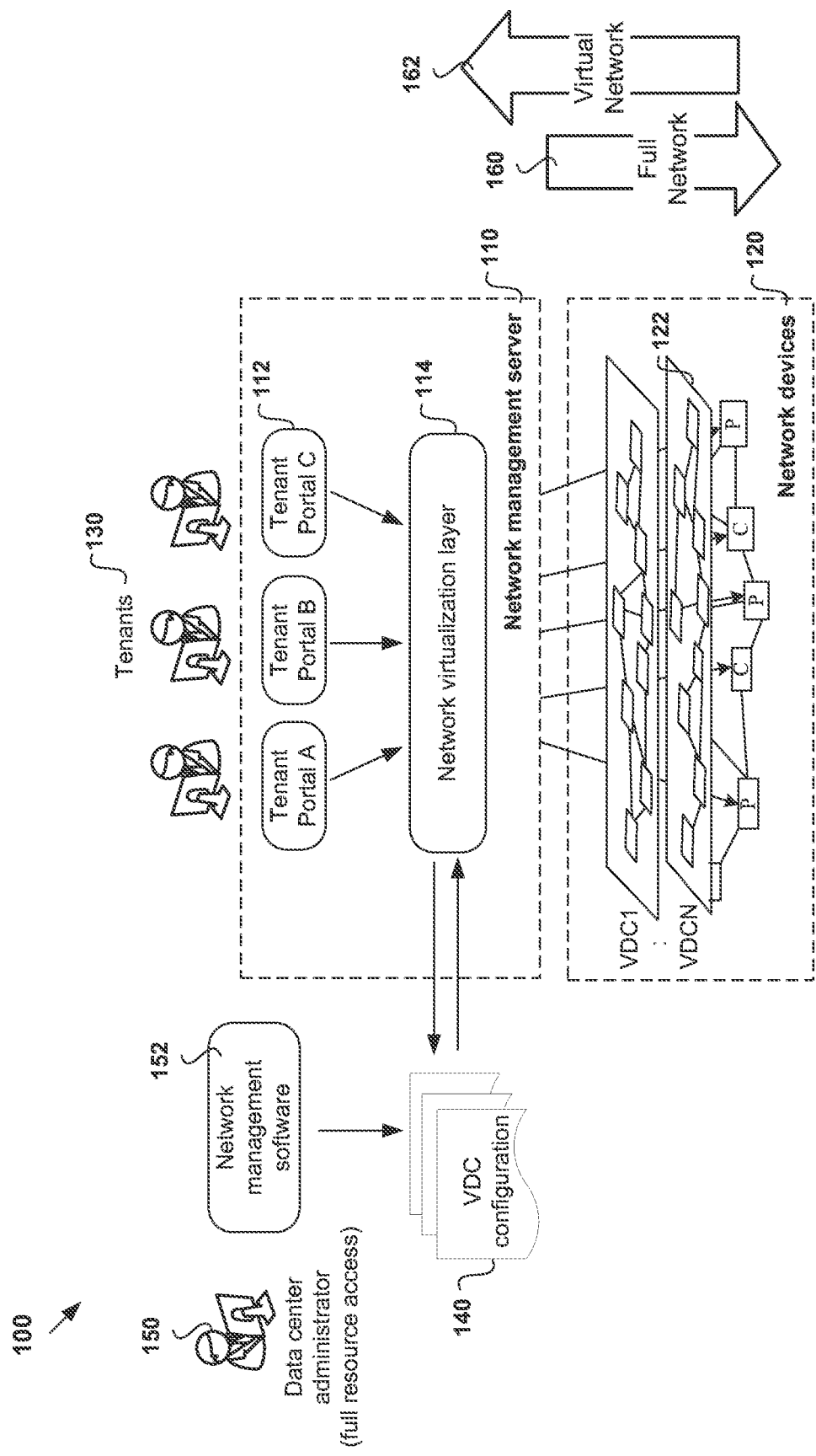
FIG. 1 is a schematic diagram of an example data center network in which network virtualization is implemented.

FIG. 1 is a schematic diagram of an example data center network 100 with includes a network management server 110 and network devices 120. The network devices 120 represent the physical network in the data center network 100 and may include switches etc. As illustrated in FIG. 1, the network devices 120 are abstracted or logically divided into different virtual networks or VDCs 122 accessible by different tenants 130.

Tenants 130 (e.g. tenant administrators etc.) access the network devices 120 via the network management server 110. From the perspective of the tenants 130, they see what appears to be a full network (see also 160) although the network management server 110 only allows them to access and manage their own VDC (see 162). For example, tenants 130 within VDC1 can only access and manage network resources of VDC1, tenants 130 within VDCN can only access and manage network resources of VDCN etc.

Network devices 120 in a data center network 100 may perform various control functions based on MQC. Throughout the present disclosure, the term MQC refers generally to a Quality of Service (QoS) configuration approach where QoS service parameters are configured using a QoS policy. For instance, a QoS policy may be a set of class-behaviour associations. A traffic behaviour for a class may be defined using a set of QoS actions to perform on packets of that class, such as traffic filtering (e.g. permit or deny), shaping, policing and priority mapping etc. A class may be configured for any type of traffic, e.g. voice traffic; voice over Internet Protocol (VOIP) traffic; video traffic; signalling traffic; network protocol traffic; operations, administration and management (OAM) traffic; low-latency streaming traffic; high-throughput traffic; low priority traffic; high priority traffic, peer to peer traffic (P2P) etc. Traffic may also be divided into different classes based on information such as Internet Protocol address and layer 4-7 information to differentiate between File Transfer Protocol (FTP), Instant Messaging (IM), Email, and Bit Torrent (BT) traffic, etc.

A classifier may be used to perform the control functions, since it has a strong ability for identification of classes or flows based on matching rules. For example, flow identification may be based on Access Control List (ACL) number, Media Access Control (MAC), Real-time Transport Protocol (RTP) port, priority, ingress interface, discarded priority, VLAN ID, protocol type etc. Example classifiers include Remark, Firewall, Account, Redirect, Mirror, Wred, Wred Class, Queue, Car, GTS, etc.

In the example in FIG. 1, the network management server 110 may include the following:

Tenant portals 112 ("first management module") via which tenants 130 access functions of the network management server 110. Different tenant portals 112 may be provided for different VDCs, such as 'Tenant Portal A' for VDC1, 'Tenant Portal B' for VDC2, and 'Tenant Portal C' for VDC3 etc.

A network management virtualization layer 114 ("second management module") to facilitate segregation among different VDCs to achieve network virtualization. In one example, network resource processing commands sent by a tenant 130 of a VDC may be processed by the network virtualization layer 114 such that only processing associated with the VDC of the tenant 130 is performed. This way, the tenant 130 can access its VDC exclusively without affecting, or being affected by, other tenants 130.

The first management module 112 and second management module 114 may be independent from each other, and the first management module 112 may be unaware of the existence of the second management module 114. In practice, the first management module 112 may be implemented using any suitable management software and the second management module 114 may serve as a management proxy (also referred to as "NetVisor").

In practice, the first management module 112 may have limited functionality and is therefore used with the second management module 114. Although the first management module 112 is implemented on the network management server 110 according to FIG. 3, it may also be implemented on a separate device on the tenant's side. In one example, the second management module 114 may be referred to as "Netvisor".

Although multiple tenant portals 112 are shown in FIG. 1, it will be appreciated that they may be combined into a single portal for different VDCs. Further, although FIG. 1 shows the first management module 114 on the network management server 110 in FIG. 1, it may be implemented on a different device, such as one on the tenant's side.

Each VDC is associated with a network resource configuration 140 (also referred to as "VDC configuration" in FIG. 1). In one example, network resource configuration 140 for each VDC may include information for flow-based differentiation, such as:

Layer 2 (data link layer) information, such as Virtual Local Area Network (VLAN), source or destination MAC, link protocol (e.g. Address Resolution Protocol (ARP) and Reverse Address Resolution Protocol (RARP)), etc.

Layer 3 (network layer) information, such as source or destination Internet Protocol (IP), IP/IPv6, IP protocol such as Transport Control Protocol (TCP), User Datagram Protocol (UDP), and Internet Control Message Protocol (ICMP), etc.

Layer 4 (transport layer) information, such as source or destination Layer-4 port, Type of Service (ToS) priority, Internet Protocol (IP) priority, differentiated services code point (DSCP), 802.1p priority, etc.

The network resource configuration 140 may be stored by the network management server 110. Alternatively or additionally, the network resource configuration 140 for each VDC may be stored on a different device local to the network management server 110 or a remote one.

A data center administrator 150 also has access to the network resource configuration of various VDCs via any suitable network management software 152. For example, the network management software 152 may be Intelligent Management Center (IMC) software. In general, full access to the network devices 120 is provided to the data center administrator 150, but of course their access may also be limited to a subset of the VDCs in the data center network 100.

Figure 2:
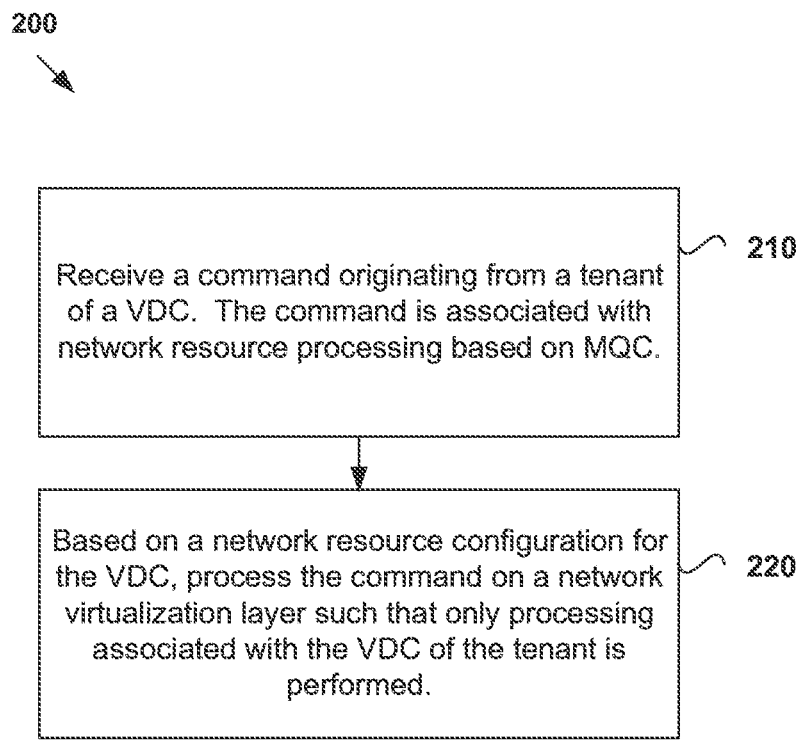
FIG. 2 is a flowchart of an example network management method.

FIG. 2 is a flowchart of an example network management method 200 for implementing network virtualization based on MQC.

At 210, the network management server 110 receives a command originating from a tenant 130 of a VDC (e.g. VDC1) in the data center network 100. The command is associated with network resource processing based on MQC.

At 220, based on a network resource configuration 140 for the VDC of the tenant 130, the network management server 110 processes the command on the network virtualization layer 114 such that only processing associated with the VDC of the tenant 130 is performed. As such, the network virtualization layer 114 of the network management server 110 therefore facilitates segregation between VDCs in the data center network 100.

Figure 3:
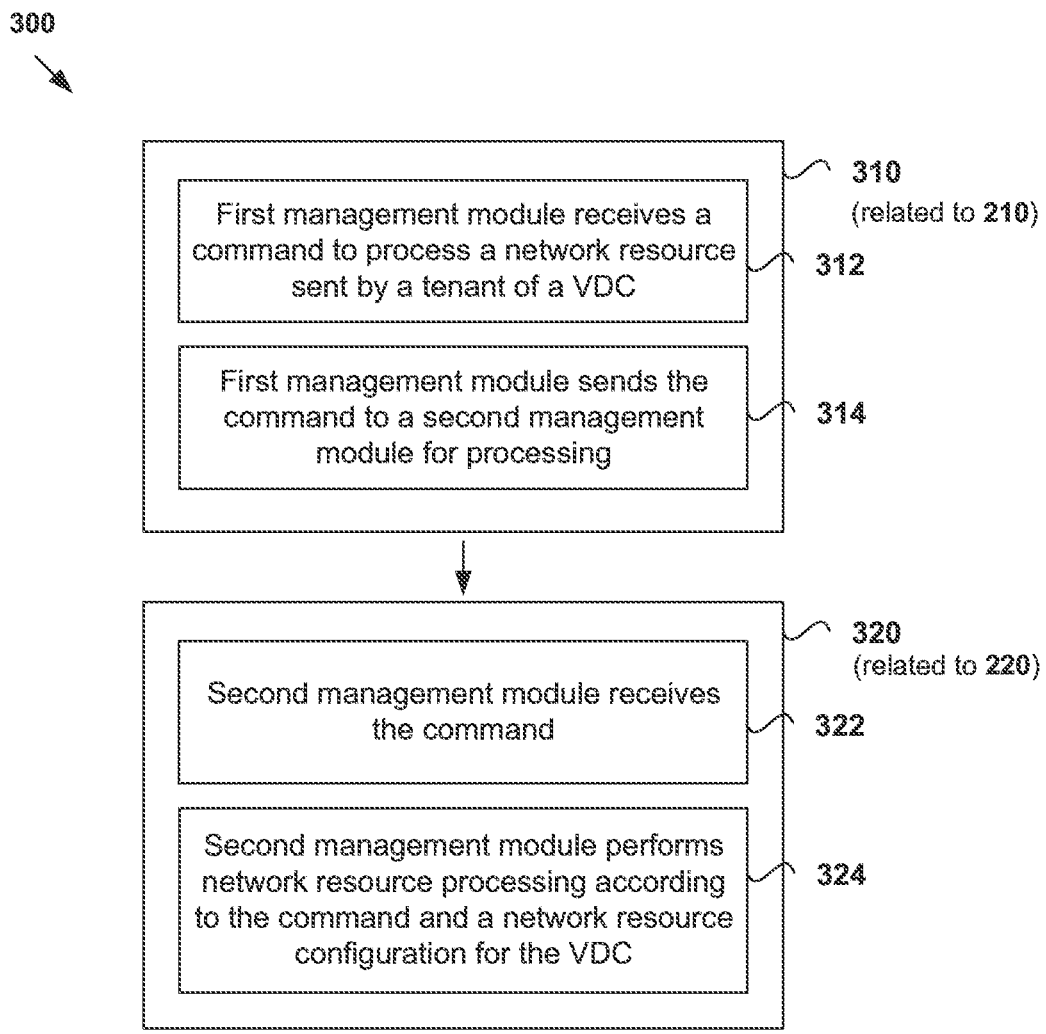
FIG. 3 is a flowchart of an example implementation of the method in FIG. 2 using first management module and second management module.

In one example implementation 300 in FIG. 3, blocks 210 and 220 in FIG. 2 may be performed by the first management module 112 and second management module 114 respectively.

At 310 (related to 210), the network management server 110 receives the command originating from a tenant of a VDC via the first management module 112 (see block 312). The first management module 112 then sends the received command to the second management module 114 for processing (see block 314).

At 320 (related to 220), the network management server 110 receives the command via the second management module 114 (see block 322), which functions as a network virtualization layer. Based on a network resource configuration 140 for the VDC, the second management module 114 processes the received command such that only processing associated with the VDC of the tenant is performed (see block 324). Any result of the processing is then sent by the second management module 114 to the tenant via the first management module 112.

Processing the received command according to blocks 220 and 320 may further include identifying the VDC of the tenant 130 from which the received command originates. The VDC may be identified based on the network resource configuration for the VDC, which stores a corresponding relationship between a VDC and information identifying the VDC. The VDC may be identified using any layer 2, layer 3 and layer 4 information discussed above. For example, the network resource configuration 140 for a VDC may store a corresponding relationship between a source IP address and the VDC. This allows identification of the VDC from a received command based on its source IP address. Once the VDC is identified, the network management server 110 may modify the command based on the identified VDC and/or network resource configuration 140 for the VDC such that only processing associated with the VDC is performed.

The received command controls network resource processing of the VDC of the tenant 130 based on MQC. The network management server 110 in turn controls network devices 120 in the network 100 through a MQC mechanism. The command may be associated with any suitable network resource processing of the VDC. For example, the command may be a network resource querying command (see FIG. 4), network resource allocation command (see FIG. 5), etc.

Network Resource Querying

Figure 4:
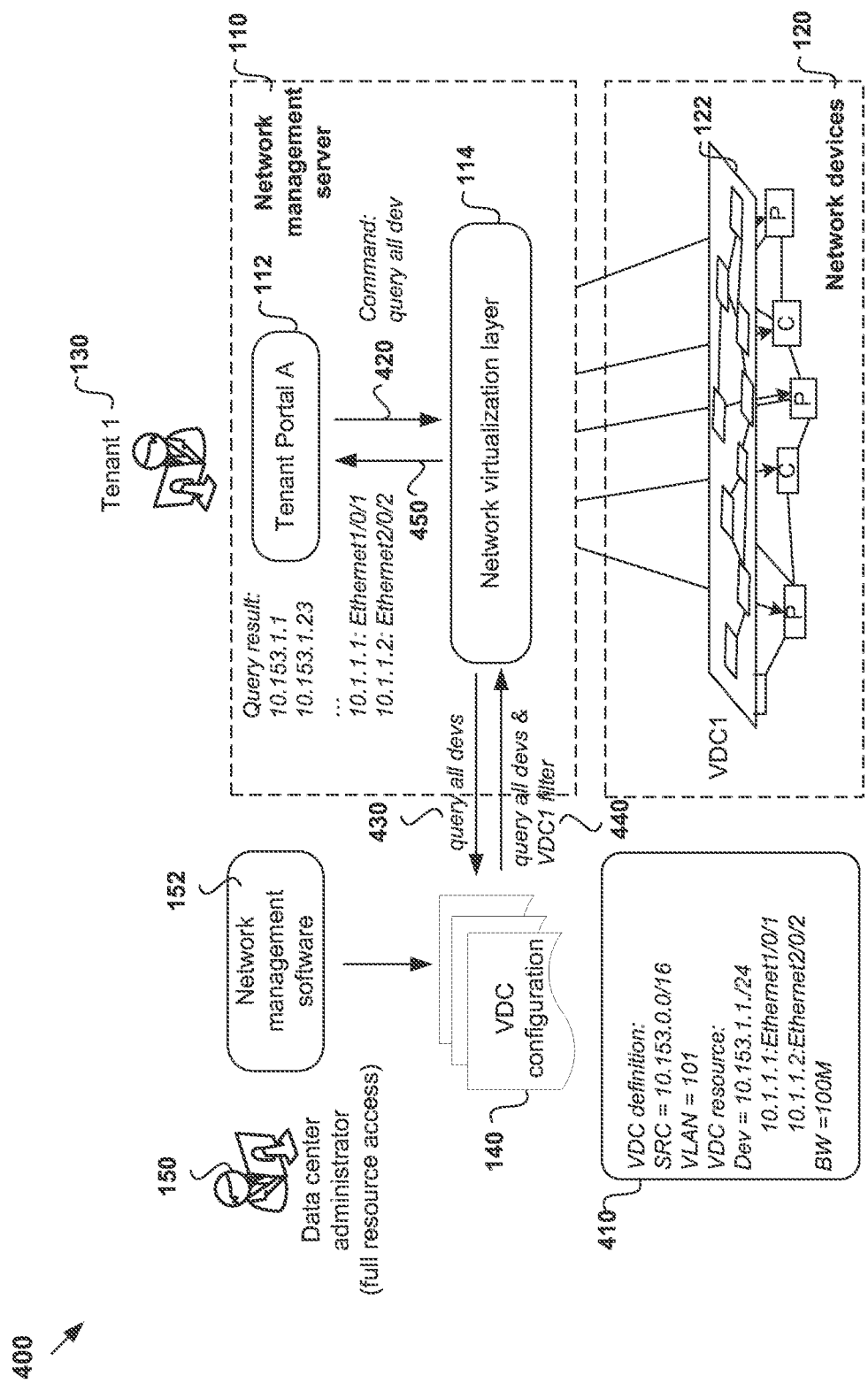
FIG. 4 is a schematic diagram of an example data center network illustrating the case where a network resource querying command is processed.

FIG. 4 illustrates an example where the received command is associated with network device querying.

At 410, a network resource configuration 140 for each VDC is stored, e.g. by the network management server 110. The network resource configuration 140 for a VDC may include information that allows differentiation of VDCs based on flows. For example, parameters relating to physical network resources (e.g. network devices and interfaces etc.) and/or logical network resources (e.g. source IP address network segment (SRC), VLAN, bandwidth, etc.) may be used.

In the example in FIG. 4, the network resource configuration 140 for VDC1 includes source IP address, VLAN information, device information and a maximum bandwidth:

VDC1
SRC=10.153.0.0/16, VLAN101,
dev=10.153.1.1/24, 10.1.1.1: Ethernet1/0/1, 10.1.1.1: Ethernet2/0/2
Bandwidth=100 M At 420, the network management server 110 receives a network device querying command issued by a tenant in VDC1 via the first management module 112. The received command is then sent to the second management module 114. In this example, the command is for querying all network devices 120 accessible by the tenant 130:

query all devs.

At 430, the second management module 114 receives the network resource query command. The second management module 114, which functions as a network virtualization layer on the network management server 110, identifies the VDC from which the network device querying command originates. For example, the network resource configuration 140 for a VDC1 may include its corresponding source IP address. The second management module 114 is able to identify a VDC (e.g. VDC1) based on the source IP address of the received command (e.g. 10.153.0.0/16).

At 440, the second management module 114 queries the network resource configuration 140 for the identified VDC so as to find network devices 120 within that VDC. For example, suppose the identified VDC is VDC1, the second management module 114 modifies or transforms the querying command based on the identified VDC to the following, i.e. by adding a filtering operation based on VDC1.

query all devs & VDC1 filter.

The modification is performed such that only network devices 120 associated with VDC1 are found. In effect, the tenant 130 of VDC1 from which the command originates can only query network devices 120 within its VDC1 although the original command (i.e. query all devs) does not specify its VDC.

At 450, the second management module 114 provides a query result to the tenant 130 via the first management module 112. In the example in FIG. 4, the query result provided to the tenant is a list of network devices 120 in VDC1, e.g. 10.153.1.1 . . . , 10.1.1.1: Ethernet1/01 (see 410 and 450).

Network Resource Allocation Command

Figure 5:
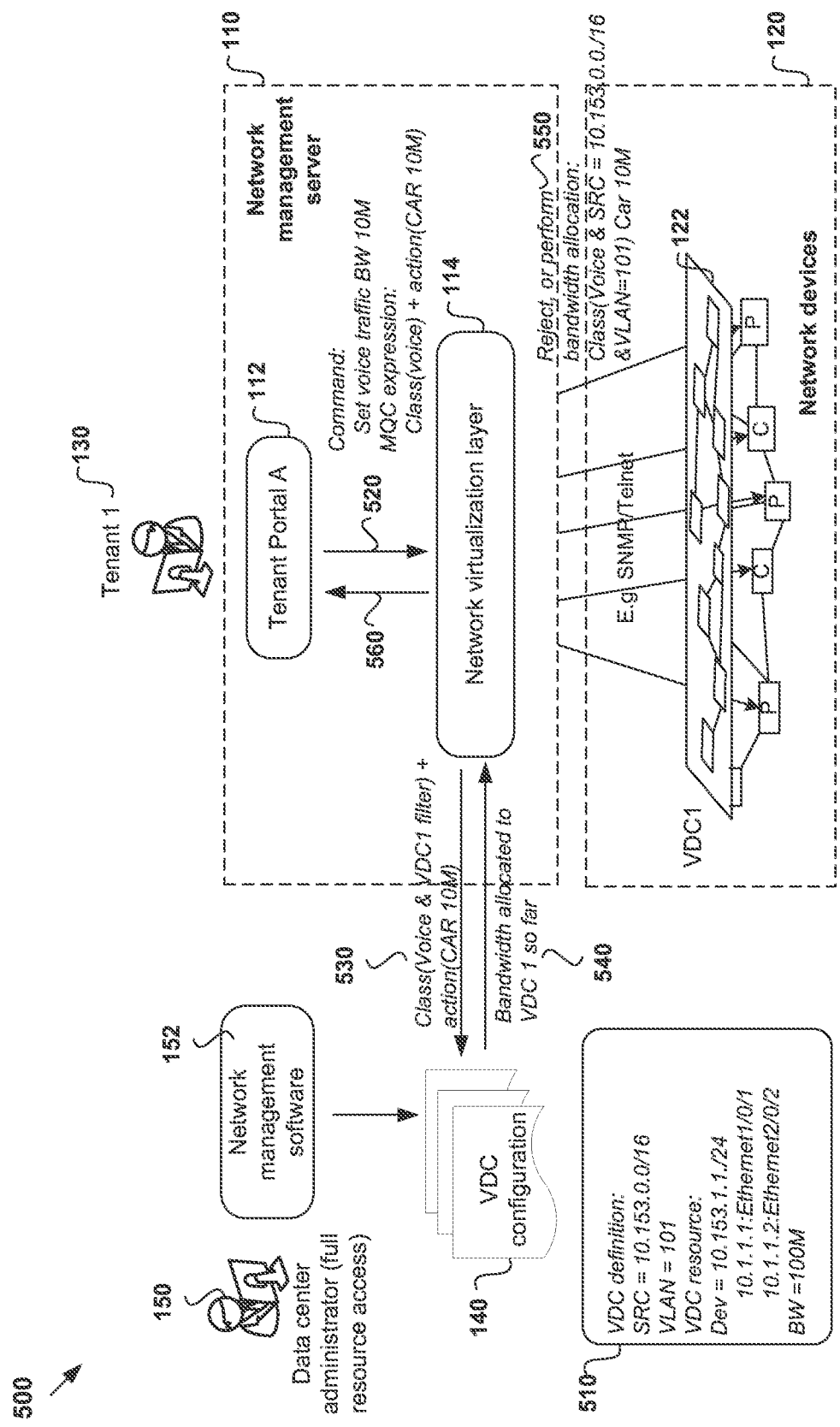
FIG. 5 is a schematic diagram of an example data center network illustrating the case where a network resource allocation command is processed.

Another example is shown in FIG. 5, which illustrates the case where the received command is associated with network resource allocation. In the following example, the network resource to be allocated includes bandwidth but it will be appreciated that any other type of network resource may be allocated in a similar manner.

At 510, a network resource configuration 140 for each VDC is stored, e.g. by the network management server 110. For example, similar to 410 in FIG. 4, the network resource configuration 140 for VDC1 may include the following:

VDC1
SRC=10.153.0.0/16, VLAN101,
dev=10.153.1.1/24, 10.1.1.1: Ethernet1/0/1, 10.1.1.1: Ethernet2/0/2
Bandwidth=100 M At 520, the network management server 110 receives a bandwidth allocation command issued by a tenant in VDC1 via the first management module 112. The received command is then sent to the second management module 114. For example, the command may be for allocating 10 M of bandwidth to voice traffic, i.e. 'set voice traffic BW 10 M'. The command based on MQC expression is as follows, where CAR represents committed access rate (e.g. 10 M bandwidth), and action represents an operation (e.g. bandwidth resource allocation):

Class (voice)+action (CAR 10 M)

At 530, after receiving the bandwidth allocation command, the second management module 114 (which functions as a network virtualization layer), identifies the VDC from which the command originates. The identification may be performed based on information pre-configured in the network resource configuration for the VDC, e.g. a source IP address of the command etc. In the example in FIG. 5, the second management module 114 identifies VDC1 as the VDC from which the command originates. In this case, the command is transformed based on the identified VDCs:

Class (voice & VDC1 filter)+action (CAR 10 M)

At 540, the second management module 114 searches for the network resource configuration 140 for the identified VDC to determine the bandwidth allocated to the VDC.

At 550, the second management module 114 performs the bandwidth allocation if the allocation does not result in the VDC exceeding its predetermined maximum bandwidth. For example in FIG. 5, a maximum of BW=100 M may be allocated to VDC1. If 90 M is previously allocated to VDC1 and the command is for allocating an additional bandwidth of more than 10 M (i.e. 100 M−90 M), the allocation will not be performed. In this case however, since the command is for allocating 10 M or less, the second management module 114 will allocate the requested bandwidth to the VDC.

To effect the bandwidth allocation, the following MQC command may be issued to the relevant network device, such as using a SNMP or Command Line Interface (CLI):

Class (voice & SRC=10.153.0.0/16 & VLAN=101) +action (CAR 10 M)

The bandwidth allocated to each VDC may then be recorded after the bandwidth allocation is complete to facilitate future determination of whether or not to perform further bandwidth allocation. For example, in this case, command for further bandwidth allocation will be rejected since the maximum bandwidth, i.e. 90 M (previously allocated)+10 M (current command), is already allocated to VDC1.

From the examples in FIG. 4 and FIG. 5, it can be seen that a command received from a tenant of a particular VDC (e.g. VDC1) is processed according to a principle that a tenant within a VDC can only process network resources within its VDC.

To ensure safe transmission of data messages within a particular VDC, different VDCs are isolated from each other. In one example, network devices 120 of each VDC may be configured with an MQC command that only traffic within each VDC is allowed. Other traffic is discarded by default (except for management or control traffic). Taking VDC1 as an example, the following commands may be configured on the network devices 120 in VDC1:

Class (VDC1 filter to VDC1 filter)→permit
Class default→deny

In addition, in one example, if the command would affect segregation among VDCs, the command will not be processed, i.e. the command will be filtered by the second management module 114 and a failed result will be returned to the tenant 130 who sends the command via the first management module 112. For example, the following command is for modifying the configuration of VDC1 into the configuration of VDC2 to allow mutual communication between them. Since the command affects the isolation or segregation between VDC1 and VDC2, the command will be filtered and a failed result is returned.

Set VDC1 to VDC 2→permit.

Example Network Devices 600/700

Figure 6:
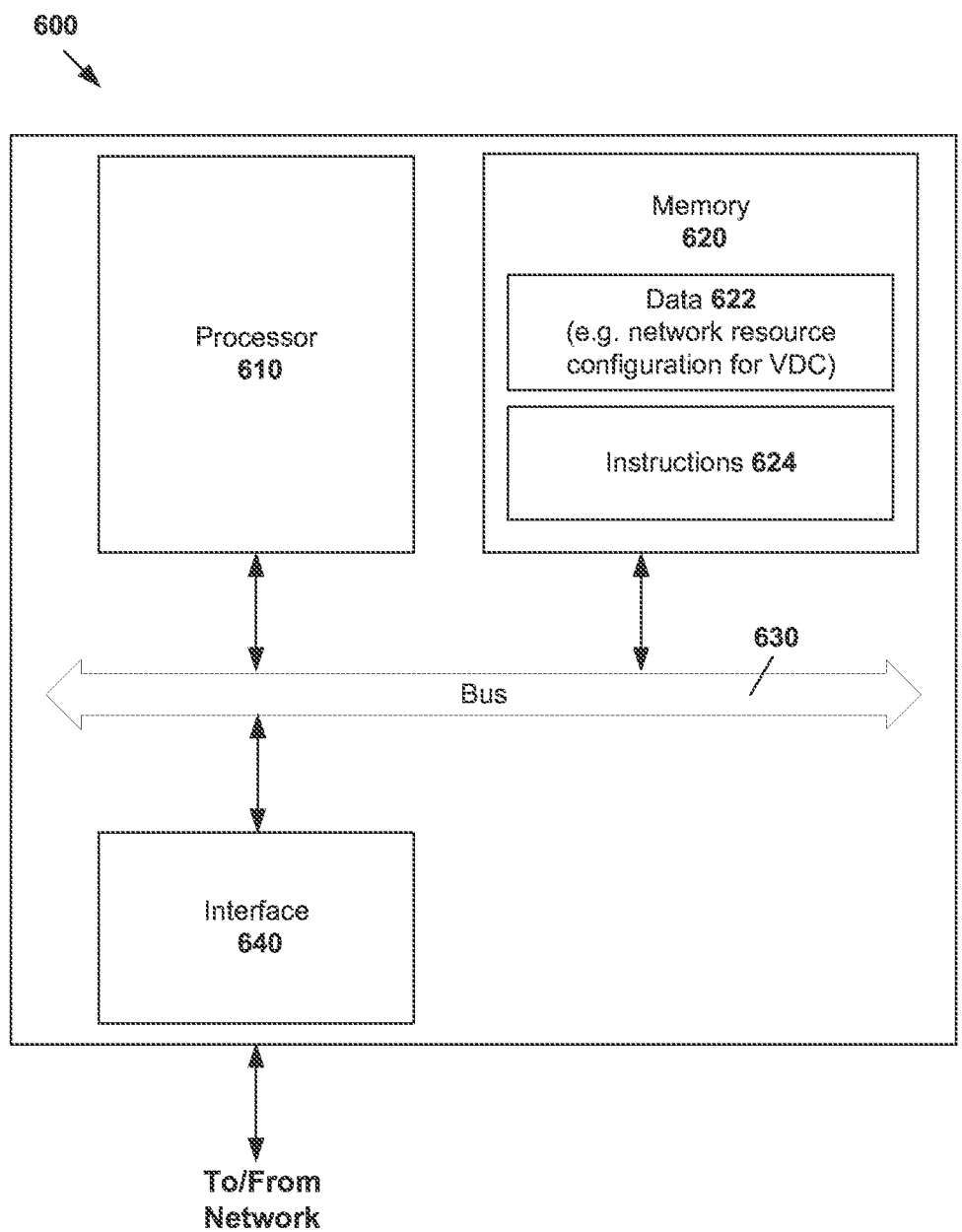
FIG. 6 is a schematic diagram of an example structure of a device capable of acting as a network management server.

The above examples can be implemented by hardware, software or firmware or a combination thereof. Referring to FIG. 6, an example network device 600 capable of acting as a network management server 110 for implementing network virtualization based on MQC.

The example network device 600 includes a processor 610, a memory 620 and a network interface device 640 that communicate with each other via bus 630. The processor 610 is to perform processes described herein with reference to FIG. 1 to FIG. 6. In one example, the processor 610 is to perform the following:

Receive a command originating from a tenant of a virtual data center (VDC) in the data center network, the command being associated with network resource processing based on MQC.

Based on a network resource configuration for the VDC, processing the received command on a network virtualization layer of the network management server such that only processing associated with the VDC of the tenant is performed.

The memory 620 may store any necessary data 622 for facilitating implementation of network virtualization based on MQC, e.g. network resource configuration 140 for each VDC. Of course, as previously explained, the network resource configuration 140 may be stored on a different device.

The memory 620 may store machine-readable instructions 624 executable by the processor 610 to cause the processor 610 to perform processes described herein with reference to FIG. 1 to FIG. 5. In one example, the instructions 624 (not shown in FIG. 6 for simplicity) may include:

Receiving instructions to receive a command originating from a tenant of a virtual data center (VDC) in the data center network, the command being associated with network resource processing based on MQC.

Processing instructions to, based on a network resource configuration for the VDC, process the received command on a network virtualization layer of the network management server such that only processing associated with the VDC of the tenant is performed.

Figure 7:
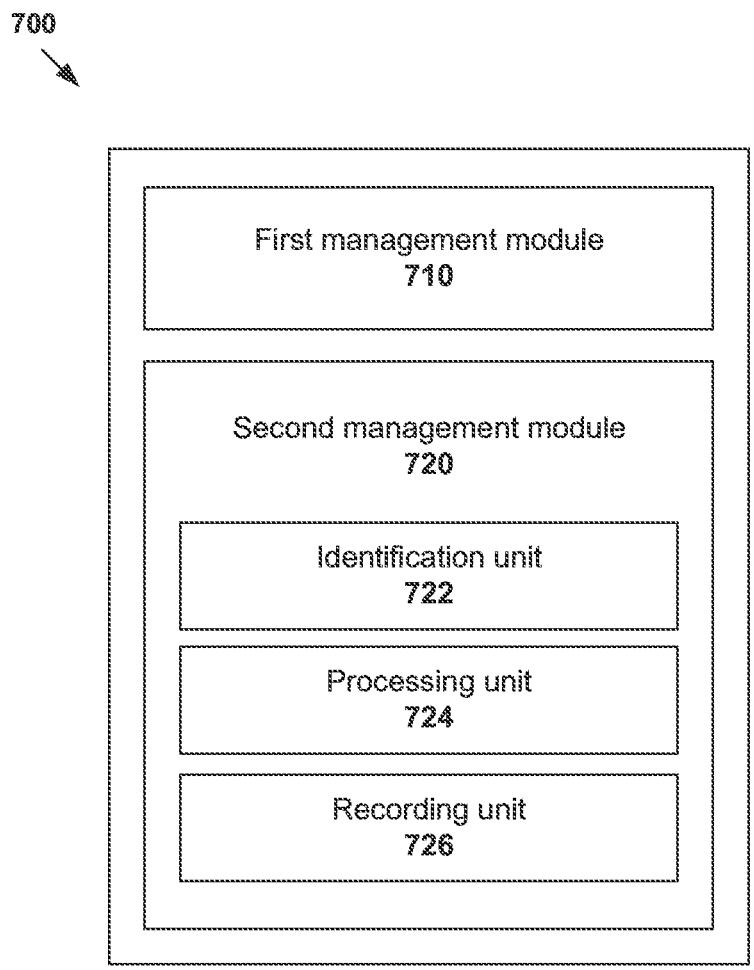
FIG. 7 is a schematic diagram of another example structure of a device capable of acting as a network management server.

In another example shown in FIG. 7, an example device 700 capable of acting as the network management server 110 may include the following modules (which may be software, hardware or a combination of both):

First management module 710 (see also 112 in FIG. 1) to receive a command originating from a tenant of a virtual data center (VDC) in the data center network, the command being associated with network resource processing based on MQC. The first management module 710 is further to send the command to a second management module 720.

Second management module 720 (see also 114 in FIG. 1) to receive the command from the first management module 710 and based on a network resource configuration for the VDC, process the received command on a network virtualization layer of the network management server such that only processing associated with the VDC of the tenant is performed.

In one implementation, the second management module 720 may further include an identification unit to identify the VDC from which the received command originates, and a processing unit to process the received command (e.g. after modifying the command based on the identified VDC). The second management module 720 may further include a recording unit to record network resource already assigned or allocated to a VDC. The example device 700 may also further include a storage module to store network resource configuration information.

When processing the received command, the processor 610 (or second management module 720) may be further to identify the VDC of the tenant from which the command originates; and modify the received command based on the identified VDC and/or the network resource configuration for the VDC.

In the case where the received command is a network resource querying command, the processor 610 (or second management module 720) may be further to query, from the network resource configuration for the VDC, a network resource within the identified VDC; and return a query result to the tenant from which the received command originates.

In the case where the received command is a network resource allocation command, the processor 610 (or second management module 720) may be further to allocate a network resource to the identified VDC according to the received command; and return a resource allocation result to the tenant from which the received command originates.

The received command may be associated with allocation of a network resource that comprises bandwidth. In this case, when processing the received command, the processor 610 (or second management module 720) may be further to determine the amount of network resource already allocated to the identified VDC based on a recorded allocation of network resource to the identified VDC. Based on the amount of network resource already allocated to the identified VDC, the processor 610 (or second management module 720) may be further to determine whether allocation of the network resource to the identified VDC would exceed a predetermined maximum amount in the network resource configuration for the VDC. If not exceeded, the network resource is allocated, but otherwise not allocated.

If the received command is a command that affects segregation between the VDC of the tenant and another VDC, the processor 610 (or second management module 720) may be to discard the received command and return a failed result to the tenant from which the received command originates.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors 610; reference in this disclosure or the claims to a 'processor' should thus be interpreted to mean 'one or more processors'.

Although one network interface device 640 is shown in FIG. 6, processes performed by the network interface device 640 may be split among multiple network interface devices (not shown for simplicity). As such, reference in this disclosure to a 'network interface device' should be interpreted to mean 'one or more network interface devices".

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A network management method for implementing network virtualization based on modular quality of service control (MQC) in a data center network, the method comprising a network management server:

receiving a quality of service command originating from a first tenant of a first virtual data center (VDC) in the data center network which comprises a plurality of tenants including the first tenant and at least one of a plurality of VDCs associated with each of the plurality of tenants, wherein the quality of service command is associated with network resource processing based on MQC; and based on a network resource configuration for the first VDC, processing the received quality of service command on a network virtualization layer of the network management server, wherein the processing of the quality of service command includes:

modifying the received quality of service command to produce a modified command that when executed performs only processing associated with the first VDC of the first tenant, wherein the first VDC is segregated from other VDCs of the plurality of VDCs in the data center network, and executing the modified command from the first tenant with respect to a network device in the first VDC only and without affecting the other VDCs of the plurality of VDCs in the data center network for restricting the first tenant to controlling only the first VDC in the data center network, wherein the modifying of the received quality of service command comprises adding a filter based on the first VDC to the received quality of service command to produce the modified command that includes the filter based on the first VDC.

2. The method of claim 1, wherein:

the network management server comprises a first management module and a second management module;

the quality of service command is received by the first management module of the network management server and sent to the second management module via the first management module; and the processing of the received quality of service command is performed by the second management module.

3. The method of claim 1, wherein the processing of the received quality of service command includes identifying the first VDC of the first tenant from which the quality of service command originates, and wherein the modifying of the received quality of service command comprises adding an attribute to the received quality of service command to produce the modified command, the attribute selected from the group consisting of: an identifier of the first VDC and information of the network resource configuration for the first VDC.

4. The method of claim 3, wherein the received quality of service command is a network resource querying command and the processing of the received quality of service command includes:

querying, from the network resource configuration for the first VDC, a network resource within the identified first VDC; and returning a query result to the first tenant.

5. The method of claim 3, wherein the received quality of service command is a network resource allocation command and the processing of the received quality of service command includes:

allocating a network resource to the first VDC according to the received quality of service command; and returning a resource allocation result to the first tenant.

6. The method of claim 5, further comprising recording an allocation of the network resource to the first VDC.

7. The method of claim 1, wherein the received quality of service command is associated with an allocation of a network resource that comprises a requested bandwidth, and when processing the received quality of service command, the network management server:

determines an amount of bandwidth already allocated to the first VDC based on a recorded allocation of network resource to the first VDC;

based on the amount of bandwidth already allocated to the first VDC, determines whether allocation of the requested bandwidth to the first VDC would exceed a predetermined maximum amount in the network resource configuration for the first VDC; and allocates the requested bandwidth if the predetermined maximum amount would not be exceeded, but otherwise does not allocate the requested bandwidth.

8. The method of claim 1, wherein in response to determining that the received quality of service command is a command that affects segregation between the first VDC of the first tenant and another of the plurality of VDCs in the data center network, the processing of the received quality of service command includes:

discarding the received quality of service command and returning a failed result to the first tenant from which the received quality of service command originates.

9. The method of claim 1, wherein the received quality of service command is without the filter based on the first VDC.

10. The method of claim 9, wherein the filter based on the first VDC includes an identifier of the first VDC.

11. The method of claim 1, wherein executing the modified command with respect to the network device in the first VDC comprises issuing, by the network management server, the modified command to the network device in the first VDC.

12. The method of claim 1, wherein the data center network comprises a network virtualization layer to facilitate segregation among the plurality of VDCs by providing visibility of all of the plurality of VDCs in the data center network to each of the plurality of tenants while restricting control and management for each of the plurality of tenants to respective VDCs.

13. A network management server for implementing network virtualization based on modular quality of service control (MQC) in a data center network, the network management server comprises a processor to:

receive a quality of service command originating from a first tenant of a first virtual data center (VDC) in the data center network which comprises a plurality of tenants including the first tenant and at least one of a plurality of VDCs associated with each of the plurality of tenants, wherein the quality of service command is associated with network resource processing based on MQC;

based on a network resource configuration for the first VDC, process the received quality of service command on a network virtualization layer of the network management server to produce a modified quality of service command that when executed performs processing associated with the first VDC of the first tenant, wherein the first VDC that is segregated from other VDCs of the plurality of VDCs in the data center network; and execute the modified quality of service command from the first tenant with respect to a network device in the first VDC only and without affecting the other VDCs of the plurality of VDCs in the data center network, wherein the modifying of the received quality of service command comprises adding a filter based on the first VDC to the received quality of service command to produce the modified command that includes the filter based on the first VDC.

14. The network management server of claim 13, wherein when processing the received quality of service command, the processor is further to:

identify the first VDC of the first tenant from which the quality of service command originates; and modify the received quality of service command by adding an attribute to the received quality of service command to produce the modified quality of service command, the attribute selected from the group consisting of: an identifier of the first VDC and information of the network resource configuration for the first VDC.

15. The network management server of claim 14, wherein the received quality of service command is a network resource allocation command and when processing the received quality of service command, the processor is further to:

allocate a network resource to the first VDC according to the received quality of service command; and return a resource allocation result to the first tenant.

16. The network management server of claim 15, wherein the received quality of service command is associated with allocation of a network resource that comprises a requested bandwidth, and when processing the received quality of service command, the processor is further to:

determine an amount of bandwidth already allocated to the first VDC based on a recorded allocation of network resource to the first VDC;

based on the amount of bandwidth already allocated to the first VDC, determine whether allocation of the requested bandwidth to the first VDC would exceed a predetermined maximum amount in the network resource configuration for the first VDC; and allocate the requested bandwidth if the predetermined maximum amount would not be exceeded, but otherwise not allocate the requested bandwidth.

17. The network management server of claim 14, wherein if the received quality of service command is a command that affects segregation between the first VDC of the first tenant and another VDC, the processor is to:

discard the received quality of service command and return a failed result to the first tenant.

18. A method comprising:

receiving a quality of service command at a first module of a network management system from a first tenant of a first virtual data center (VDC) which comprises a plurality of tenants including the first tenant and at least one of a plurality of VDCs associated with each of the plurality of tenants; and providing the received quality of service command to a second module of the network management system by the first module;

modifying the received quality of service command to produce a modified command that when executed performs processing associated with the first VDC, the first VDC being segregated from other VDCs of the plurality of VDCs in the data center network; and executing the modified quality of service command from the first tenant with respect to a network device associated with the first VDC only and without affecting the other VDCs of the plurality of VDCs in the data center network for restricting the first tenant to controlling only the first VDC in the data center network, wherein the modifying of the received quality of service command comprises adding a filter based on the first VDC to the received quality of service command to produce the modified command that includes the filter based on the first VDC.

19. The method of claim 18, wherein the modifying of the received quality of service command includes modifying the quality of service command to add a source IP address network segment associated with the first VDC, wherein the received quality of service command is without the source IP address network.

\* \* \* \* \*